United States Patent [19]

Topf

[11] 3,912,211

[45] Oct. 14, 1975

[54] PICTURE HOOK

[75] Inventor: Sam B. Topf, Coral Gables, Fla.

[73] Assignee: Jordan Industries, Inc., Miami, Fla.

[22] Filed: June 28, 1974

[21] Appl. No.: 483,951

[52] U.S. Cl. .............................. 248/217; 248/497
[51] Int. Cl.² .......................................... A47G 1/20
[58] Field of Search ..... 24/230.5 PH; 248/217, 301, 248/339, 489, 497, 498, 493; D8/257

[56] References Cited

UNITED STATES PATENTS 3,861,631  1/1975  Shorin ................................ 248/301

FOREIGN PATENTS OR APPLICATIONS

| 451,766 | 2/1913 | France ................................ 248/301 |
| 682,184 | 10/1939 | Germany ............................ 248/217 |
| 10,991 | 5/1914 | United Kingdom ................. 248/301 |
| 385,579 | 1923 | Germany ............................ 248/217 |

Primary Examiner—Paul R. Gilliam
Assistant Examiner—Kenneth J. Dorner
Attorney, Agent, or Firm—Wolfe, Hubbard, Leydig, Voit & Osann, Ltd.

[57] ABSTRACT

A picture hook includes a generally flat body with a depending leg having a hooked lower end portion from which a picture may be hung when the hook is mounted on a wall. An aperture in the central portion of the body receives a fastener for securing the picture hook to the wall and upper and lower lips formed in the body around the aperture serve to guide the fastener into the wall at a preselected angle. The upper lip projects rearwardly and downwardly from the body to define the upper edge of the aperture and the lower lip extends upwardly and forwardly from the body to define the lower edge of the aperture. A crescent-shaped indentation in the front side of the body above the aperture receives the upper portion of the head of the fastener so the latter is disposed out-of-the-way to avoid interfering with the hanging of the picture.

1 Claim, 5 Drawing Figures

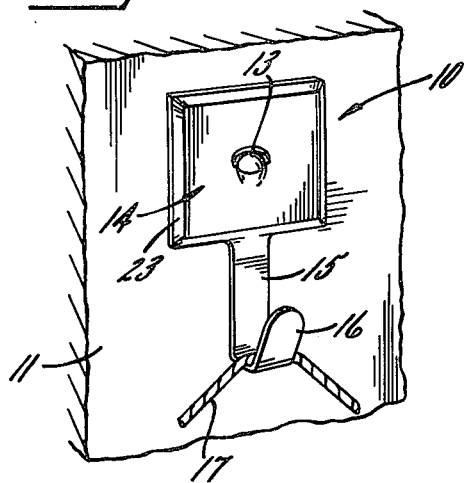
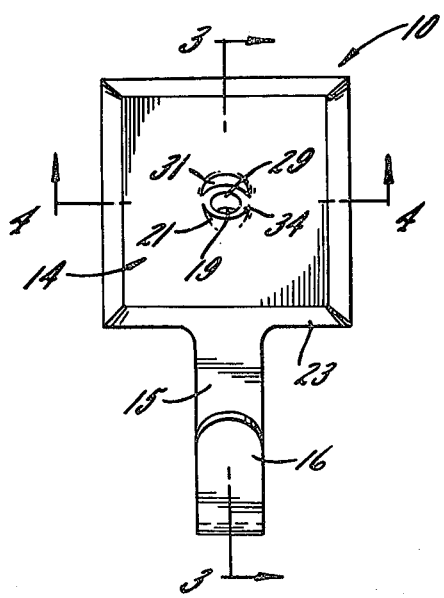
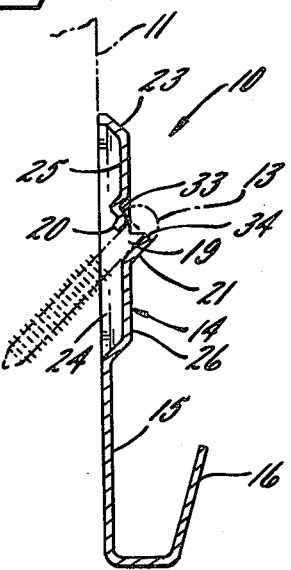
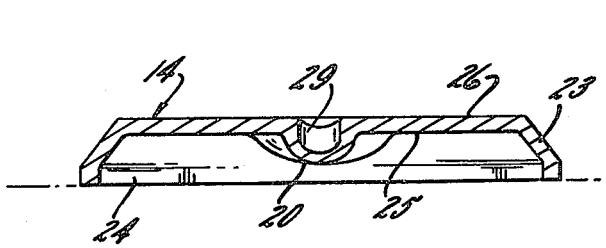
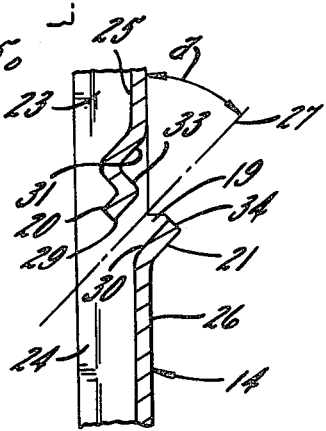

PICTURE HOOK

BACKGROUND OF THE INVENTION

This invention relates to a picture hook of the type which is fastened to a wall by means of a fastener such as a nail so that a picture or other article may be hung on the wall from the hook. More particularly, the invention relates to a picture hook which is constructed so as to guide the nail into the wall at a selected angle slanted downwardly into the wall as the fastener is being driven into the wall.

SUMMARY OF THE INVENTION

The primary object of the present invention is to provide a generally flat picture hook which is adapted to be held flat against the wall by the fastener and which still serves to guide the fastener into the wall at the selected angle when the fastener is being driven into the wall. A further object of the present invention is to accomplish the foregoing while also providing a picture hook which is less expensive to manufacture and is easier to install on a wall than prior picture hooks of the above general character.

The invention also resides in the unique construction of the body of the picture hook and, in particular, the construction of an aperture through the body for receiving the fastener so the head of the fastener is held closer to the surface of the wall.

These and other objects and advantages of the present invention will become more apparent from the following detailed description when taken in conjunction with the accompanying drawings.

BRIEF DESCRIPTION OF THE DRAWINGS

FIG. 1 is a fragmentary perspective view showing a picture hook embodying the present invention mounted on a wall.

FIG. 2 is an enlarged front elevational view of the picture hook.

FIG. 3 is a cross-sectional view taken substantially along line 3—3 of FIG. 2.

FIG. 4 is an enlarged cross-sectional view taken substantially along line 4—4 of FIG. 2.

FIG. 5 is an enlarged fragmentary view similar to FIG. 3.

DETAILED DESCRIPTION OF THE PREFERRED EMBODIMENT

As shown in the drawings for purposes of illustration, the present invention is embodied in a picture hook 10 such as is mounted on a wall 11 by means of a headed fastener 13 such as a nail so that a picture (not shown) or the like may be hung on the wall. Herein, the picture hook includes a body 14 with a projection in the form of an integral leg 15 depending from the body. The lower end portion 16 of the leg is hooked forwardly and upwardly in the usual manner so that a cord 17 fastened on the back of the picture may be hung from the leg.

In accordance with the primary aspect of the present invention, the picture hook 10 is constructed in a novel fashion so that, in service use, the body 14 fits flat against the wall while still serving to guide the fastener 13 into the wall at a preselected angle for fastening the hook securely to the wall to support the picture. For these purposes, the body of the picture hook is generally flat and includes an aperture 19 formed therethrough to receive the fastener. Upper and lower lips 20 and 21 formed in the body around the aperture, respectively, extend rearwardly and forwardly of the body and cooperate to guide the fastener through the aperture at the preselected angle while the fastener is being driven into the wall. By virtue of this construction, the picture hook may be mounted on the wall more easily and, once mounted on the wall, both the body and the fastener are held flatter against the wall so as to avoid interfering with the cord 17 as the picture is being hung.

In the present instance, the body 14 is generally rectangular in shape, but it will be appreciated that virtually any flat shape may be employed as well as any decorative design that is deemed suitable. In addition, a rearwardly extending flange 23 is formed integrally with and completely around the periphery of the body and thus defines a slight recess 24 adjacent the back side 25 of the body. Herein, the aperture 19 is formed in the center portion of the body to receive the fastener or nail 13 and is only slightly greater in diameter than the diameter of the shank of the nail. The lower lip 21 projects forwardly and upwardly from the front side 26 of the body to define the lower edge of the aperture while the upper edge of the aperture is defined by the upper lip 20. The latter projects rearwardly and downwardly from the back side so the two lips are positioned to define the central axis 27 (see FIG. 5) of the aperture as extending downwardly and rearwardly through the body at the preselected angle. Preferably, the angle, as indicated by $a$ in FIG. 5, is on the order of 45° measured from the vertical to provide the strongest connection between the nail 13 and the wall 11.

As shown in FIGS. 2 and 3, each of the lips 20 and 21 are provided with interior curved surfaces 29 and 30, respectively, extending generally parallel with the axis $a$ so as to both support and guide the nail as it is driven into the wall. In addition, a crescent-shaped indentation 31 (FIGS. 2 and 5) is formed in the body above the aperture 19 to receive the upper portion of the head of the nail so the upper portion of the head seats against a flat bottom wall 33 of the indentation and the lower portion of the head seats against the outer edge 34 of the lower lip. Herein, the bottom wall extends into the body along a plane perpendicular to the axis 27 of the aperture. Thus, when the nail is driven into the wall as shown in FIG. 3, the head is located so as to avoid interfering with the cord 17 when hanging the picture from the picture hook 10.

Because of the uniquely simple construction of the picture hook 10, it advantageously lends itself to particularly easy manufacture and may be made quite inexpensively by conventional stamping processes. Thus, the aperture 19, lips 20 and 21, indentation 31 and recess 24 may be formed simultaneously in the body 14 while at the same time also forming the body in the particular decorative design desired.

In view of the foregoing, it will be appreciated that the picture hook 10 of the present invention not only is capable of being manufactured easily and inexpensively but also, in service use, fits flat against the wall while still serving to guide the nail 13 into the wall at the best angle $a$ for supporting the picture on the wall. In addition, with the exemplary picture hook, the head of the fastener is held closer to the wall to avoid interfering with the cord 17 when hanging the picture. These advantages are achieved by virtue of the unique construction of the body 14 of the picture hook to include the two lips 20 and 21 which cooperate to guide the nail through the aperture 19 and into the wall while still enabling the head of the nail to be driven against the body into an out-of-the-way position.

I claim:

1. In combination, a picture hook and a fastener for supporting said picture hook on a wall, said fastener including an elongated shank of predetermined diameter and adapted to be telescoped through said picture hook and driven into the wall to secure said picture hook on the wall, an enlarged head integrally formed with the outer end of said shank and having a substantially flat underside extending in a generally radial direction away from said shank to the periphery of said head, said picture hook including a body portion having generally flat, parallel outer and inner faces, a peripheral flange integrally formed with said body and extending inwardly therefrom a predetermined distance beyond said inner face, said flange having an inner edge formed in a plane extending generally parallel with the planes of said faces for engagement with said wall to space said inner face outwardly from said wall, a leg integrally formed with said flange and depending therefrom generally within the plane of said inner edge, said leg having a forwardly and upwardly hooked lower end portion for connection with a picture, an aperture formed through the central portion of said body and having a diameter slightly larger than the diameter of said shank, said aperture having a central axis extending generally at a forty-five degree angle with respect to the vertical, a lower lip integrally formed with said body along the lower edge of said aperture and projecting forwardly and upwardly from said outer face, said lower lip having a curved upper surface concentric with said aperture, said lower lip also having an outer end edge extending in a generally radial direction with respect to the curvature of said upper surface for abutting engagement with said underside of said head, an upper lip integrally formed with said body along the upper edge of said aperture and projecting rearwardly and downwardly from said inner face, said upper lip having a curved lower surface concentric with said aperture, said upper lip having an inner end edge spaced outwardly from said inner edge of said flange to keep from engagement with said wall, said lips cooperating to guide said shank through said aperture and into said wall at a downwardly extending angle of approximately 45°, and a generally crescent-shaped indentation formed in said body, said indentation being in said outer face and along the upper edge of said aperture, said indentation having a flat defining the bottom thereof, being formed in the plane of said outer end edge of said lower lip and extending radially away from said aperture a distance slightly greater than the distance between the periphery of said head and the outside of said shank of said fastener so the upper portion of said head fits within said indentation with a portion of said underside abutting said flat when said fastener is telescoped through said body and is driven into the wall for hanging a picture on the wall.

* * * * *